C. A. H. BAHDE.
FISH CLEANING DEVICE.
APPLICATION FILED JULY 7, 1919.
1,360,490.  Patented Nov. 30, 1920.
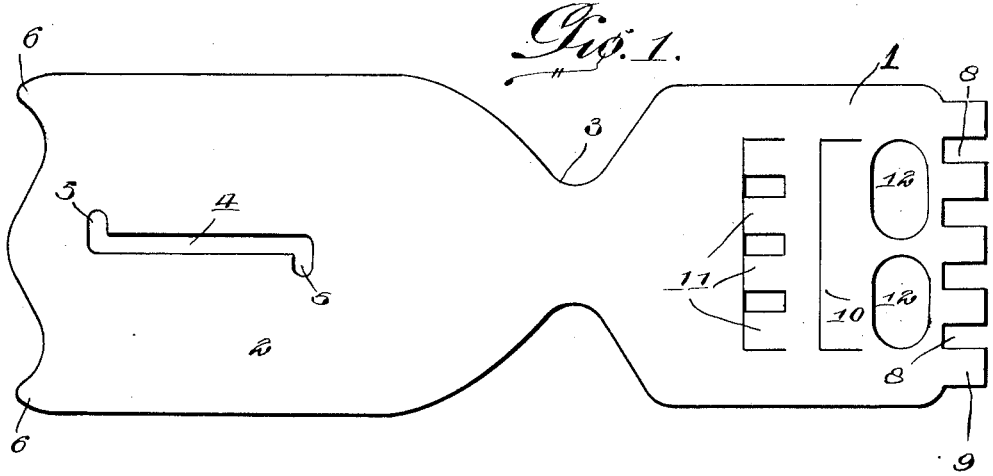
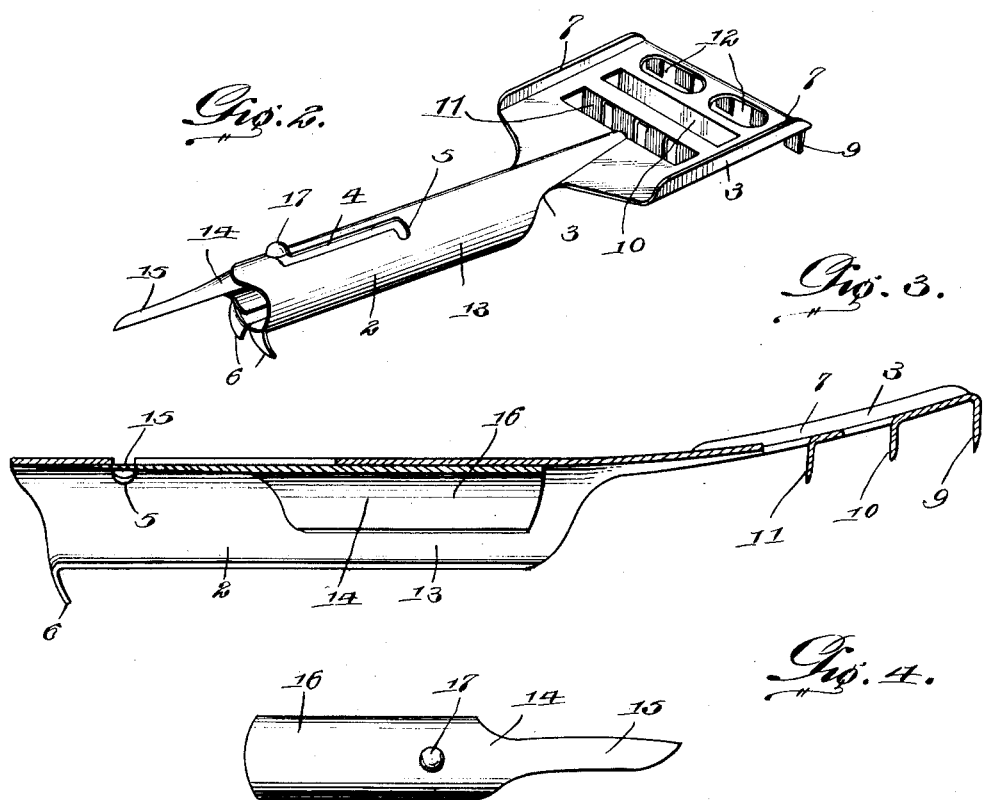
WITNESS:  INVENTOR.
BY C. H. H. Bahde.
Victor J. Evans.
ATTORNEY.

UNITED STATES PATENT OFFICE.

CARL A. H. BAHDE, OF MILWAUKEE, WISCONSIN.

FISH-CLEANING DEVICE.

1,360,490. Specification of Letters Patent. Patented Nov. 30, 1920.

Application filed July 7, 1919. Serial No. 309,000.

*To all whom it may concern:*

Be it known that I, CARL A. H. BAHDE, a citizen of the United States, residing at Milwaukee, in the county of Milwaukee and State of Wisconsin, have invented new and useful Improvements in Fish-Cleaning Devices, of which the following is a specification.

This invention relates to improvements in devices for removing the scales from, and for cleaning fish, and the principal object of the invention is to provide means for removing the scales without tearing the flesh of the fish.

Another object of the invention is to make the device from one piece of metal, which is formed to provide the handle portion and a toothed portion which acts as a scaling means.

The invention also consists in certain other features of construction and in the combination and arrangement of the several parts, to be hereinafter fully described and illustrated in the accompanying drawings and specifically pointed out in the appended claim.

In describing my invention in detail reference will be had to the accompanying drawings wherein like characters denote like or corresponding parts throughout the several views, and in which:—

Figure 1 is a view of the blank from which the device is formed;

Fig. 2 is a perspective view of the device itself with the knife in open position;

Fig. 3 is a longitudinal sectional view;

Fig. 4 is a view of the knife.

As shown in these views, the device is made from a blank of material cut into the shape shown in Fig. 1, said blank consisting of the parts 1 and 2 connected together by the neck 3. The part 1 is adapted to have the scaling teeth stamped therefrom, while the part 2 is adapted to be rolled into tubular shape to provide the handle. This part is provided with the slot 4, having its ends extended at right angles and slightly curved, as at 5, to receive the holding stud of the knife. This part 2 is also provided with the rim or ears 6, which are curved to form the finger guard as shown in Fig. 2. The part 1 has its side edges bent upwardly to provide the stiffening flanges 7 and the end of this part is slotted as at 8, and the portions between the slots are bent at angles downwardly and sharpened to provide the cutting teeth 9. Intermediate the ends of said part 1 the metal is cut and the cut portions bent downwardly and sharpened to provide the long scraping knife 10, and the second row of cutting teeth 11 has the portion forming these teeth 11 slotted to divide this portion into teeth. As will be seen, the scraping knife is located between the two rows of teeth and I prefer to make the first row of teeth of greater length than the knife and the knife of greater length than the end row of teeth. I also provide openings 12 in the part 1 between the end row of teeth and the knife. As before stated, the part 2 is rolled to form the handle 13, and the neck is curved and this curve gradually tapers off into the opening formed by the second row of teeth. This neck is slightly bent so that the part 1 extends at a slight angle from the handle.

The knife member 14 is also formed from a single piece of metal which has a reduced part 15 with its edge sharpened on the knife and the other part rounded to form a handle part 16 which is adapted to fit in the handle 13. A stud 17 is secured to this part 16 and extends through the slot 4 so that the knife may be held entirely within the handle part of the scaler or projecting therefrom as shown in Fig. 2, the scaler to be made with or without the knife.

My scaler will remove the scales from fish without cutting the flesh, and as the teeth in the two rows are in staggered relation, all the scales will be removed. The scraping knife 10 acts to remove the moisture from the fish and the knife member 14 will be used for cleaning the fish.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A device of the class described comprising a handle part, a head part and a connecting neck part, said handle part being rolled in tubular form, the head part having its side edges bent upwardly to provide strengthening flanges and its end bent downwardly and slotted to provide a row of cutting teeth, and other portions cut and bent downwardly to provide a second row of cutting teeth and a scraper located between the two rows.

In testimony whereof I affix my signature.

CARL A. H. BAHDE.